(12) United States Patent
Matsumoto et al.

(10) Patent No.: US 12,459,057 B2
(45) Date of Patent: Nov. 4, 2025

(54) REPAIRING LASER WELDING METHOD AND REPAIRING LASER WELDING DEVICE

(71) Applicants: IHI INFRASTRUCTURE SYSTEMS CO., LTD., Sakai (JP); IHI CORPORATION, Tokyo (JP)

(72) Inventors: Naoyuki Matsumoto, Tokyo (JP); Yoshihiko Nakamura, Sakai (JP); Shinya Osawa, Sakai (JP); Koutarou Inose, Tokyo (JP); Junko Yamada, Tokyo (JP); Daiki Okita, Tokyo (JP); Akira Katou, Tokyo (JP)

(73) Assignees: IHI INFRASTRUCTURE SYSTEMS CO., LTD., Sakai (JP); IHI CORPORATION, Tokyo (JP)

( * ) Notice: Subject to any disclaimer, the term of this patent is extended or adjusted under 35 U.S.C. 154(b) by 981 days.

(21) Appl. No.: 17/563,181

(22) Filed: Dec. 28, 2021

(65) Prior Publication Data
US 2022/0118552 A1  Apr. 21, 2022

Related U.S. Application Data

(63) Continuation of application No. PCT/JP2020/028349, filed on Jul. 22, 2020.

(30) Foreign Application Priority Data

Jul. 24, 2019 (JP) ................................. 2019-136084

(51) Int. Cl.
*B23K 26/342* (2014.01)
*B23K 26/073* (2006.01)
(Continued)

(52) U.S. Cl.
CPC .......... *B23K 26/342* (2015.10); *B23K 26/073* (2013.01); *B23K 26/0876* (2013.01); *E01D 22/00* (2013.01)

(58) Field of Classification Search
CPC .............. B23K 26/242; B23K 2101/18; B23K 2103/04; B23K 26/037; B23K 33/004; B23K 9/0026; B23K 9/0256; B23K 9/235
(Continued)

(56) References Cited

U.S. PATENT DOCUMENTS 8,890,022 B2 * 11/2014 Beck ...................... B23K 26/24
  219/121.64
10,137,530 B2 * 11/2018 Hisada ................. B23K 26/352
(Continued)

FOREIGN PATENT DOCUMENTS

JP  H08-187587 A  7/1996
JP  2000-237887 A  9/2000
(Continued)

OTHER PUBLICATIONS

English translation of JPH 08187587A (Year: 1994).*
(Continued)

*Primary Examiner* — Chris Q Liu

(57) ABSTRACT

Irradiation with a laser beam is performed along a welding bead, while the laser beam is aimed, as an irradiation point of the laser beam, at a contact point between a deck plate and a U-rib that is contained in a non-welded portion of a root part, from a side of the welding bead of the root part. Thereby, it is possible to remove a crack beginning at the non-welded portion of the root part generated at a joining portion between the deck plate and the U-rib of a steel floor slab, by the irradiation with the laser beam.

20 Claims, 17 Drawing Sheets

(51) Int. Cl.
B23K 26/08 (2014.01)
E01D 22/00 (2006.01)

(58) Field of Classification Search
USPC .................................................. 219/121.64
See application file for complete search history.

(56) References Cited

U.S. PATENT DOCUMENTS

| | | | |
|---|---|---|---|
| 11,628,516 B2* | 4/2023 | Kobayashi | B23K 26/0626 |
| | | | 219/121.61 |
| 2009/0258245 A1 | 10/2009 | Inose et al. | |
| 2012/0024828 A1* | 2/2012 | Oowaki | B23K 26/24 |
| | | | 219/121.64 |
| 2017/0138910 A1 | 5/2017 | Usui et al. | |
| 2020/0122270 A1* | 4/2020 | Kobayashi | B23K 26/323 |
| 2020/0361033 A1* | 11/2020 | Owaki | B23K 26/22 |
| 2021/0039201 A1* | 2/2021 | Inose | B23K 26/34 |
| 2021/0162538 A1* | 6/2021 | Owaki | B23K 9/0956 |
| 2021/0276127 A1* | 9/2021 | Kumkar | B23K 26/0604 |
| 2021/0346987 A1* | 11/2021 | Inose | B23K 26/354 |

FOREIGN PATENT DOCUMENTS

| | | | |
|---|---|---|---|
| JP | 2005-111517 A | | 4/2005 |
| JP | 2006-009412 A | | 1/2006 |
| JP | 2010-133835 A | | 6/2010 |
| JP | 2013-086163 A | | 5/2013 |
| JP | 5860264 B2 | | 2/2016 |
| JP | 2016-194236 A | | 11/2016 |
| JP | 6092163 B2 | | 3/2017 |
| JP | 6196561 B2 | | 9/2017 |
| JP | 2018-024929 A | | 2/2018 |
| KR | 10-2011-0032849 A | | 3/2011 |

OTHER PUBLICATIONS

Japan Patent Office, "Decision to Grant a Patent", issued in Japanese Patent Application No. 2021-534055, which is a counterpart to U.S. Appl. No. 17/563,181, mailed on Nov. 30, 2022, 1 page.

European Patent Office, "Extended European Search Report", issued in European Patent Application No. 20 843 297.1, which is a counterpart to U.S. Appl. No. 17/563,181, on Aug. 4, 2023, 8 pages.

* cited by examiner

FIG. 6
| AIM POSITION | 4mm | 2mm | LESS THAN 0 (−) |
|---|---|---|---|
| MACRO SECTION | 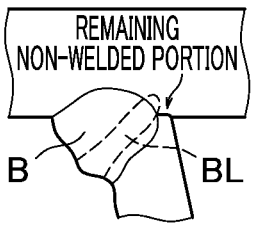 | 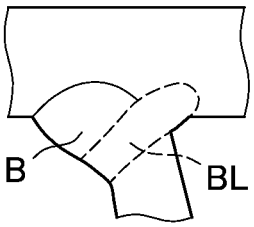 | 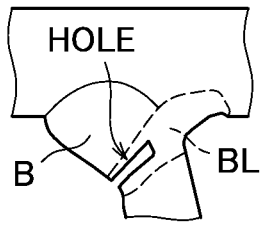 |

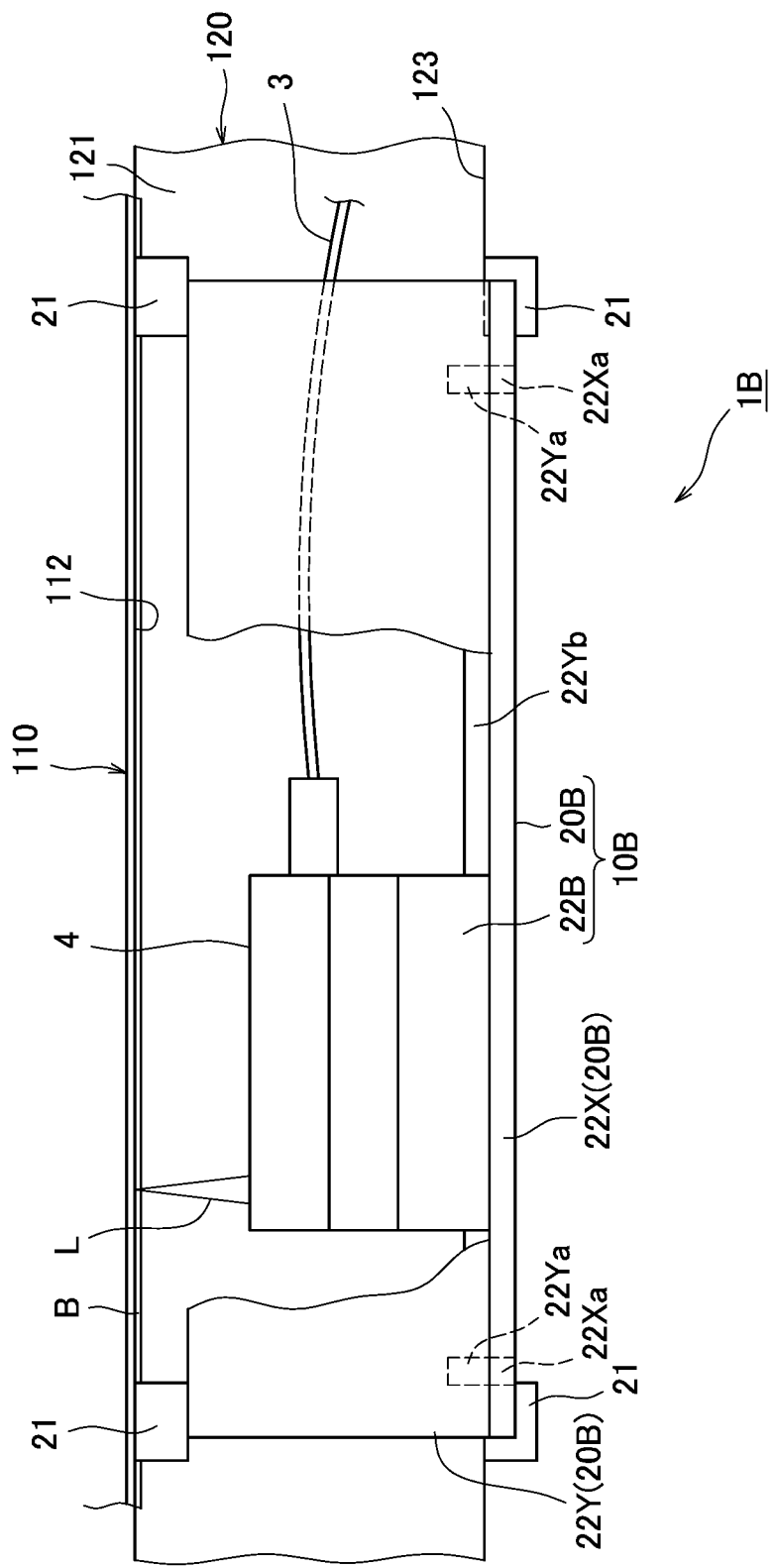

REPAIRING LASER WELDING METHOD AND REPAIRING LASER WELDING DEVICE

CROSS REFERENCE TO RELATED APPLICATIONS

This patent application is a continuation application of co-pending International Patent Application No. PCT/JP2020/028349 designating the United States of America and filed on Jul. 22, 2020, which claims the benefit of foreign priority to Japanese Patent Application No. JP 2019-136084 filed on Jul. 24, 2019, the contents of all of which are incorporated by reference herein in their entireties. The International Application was published in Japanese on Jan. 28, 2021, as International Publication No. WO 2021/015216 A1 under PCT Article 21(2).

TECHNICAL FIELD

The present disclosure relates to a repairing laser welding method and a repairing laser welding device that are used for repairing a crack generated at a joining portion between a deck plate (a first welded material) constituting a steel floor slab that supports a paved portion in a bridge and a U-rib (a second welded material) joined to a surface of the deck plate by fillet welding, for example.

BACKGROUND ART

For example, in the above steel floor slab, a side edge of the U-rib joined to the surface of the deck plate by fillet welding is obliquely joined to the deck plate. On this occasion, a non-welded portion remains at a root part of a joining portion between the deck plate and the side edge of the U-rib, but the penetration depth of a welded portion meets a prescribed numerical value that is previously determined, so that the strength is secured.

However, it is known that cracks (a deck growth crack that grows in a direction of piercing the deck plate and a bead growth crack that grows in a direction of piercing a welding bead) beginning at the non-welded portion of the root part are generated at the joining portion between the deck pate and the side edge of the U-rib, due to aging deterioration or metallic fatigue.

Conventionally, in the case where the above crack beginning at the non-welded portion of the root part is generated at the joining portion between the deck plate and the side edge of the U-rib in the steel floor slab, a paved portion on the steel floor slab is taken away and then reinforcement by a stiffening plate and repair are performed.

In this conventional repair construction, for taking away the paved portion on the steel floor slab, it is necessary to perform traffic regulation. In recent years, for avoiding the traffic regulation, for example, a welding method described in Patent Document 1 has been proposed.

In this welding method, the irradiation direction of a laser beam is set to a growth direction of the crack that is generated in the bead, and thereby the crack is eliminated.

RELATED ART DOCUMENT

Patent Document

Patent Document 1: Japanese Patent No. 6092163

SUMMARY OF THE DISCLOSURE

Problems to be Solve by the Disclosure

However, the above conventional welding method for crack removal is not intended for the removal of the deck growth crack that grows in the direction of piercing the deck plate, even though the bead growth crack can be eliminated by the irradiation with the laser beam. Accordingly, there is conventionally a problem about how to remove the deck growth crack by the irradiation with the laser beam.

The present disclosure has been made for solving the above conventional problem, and has an object to provide a repairing laser welding method and a repairing laser welding device that make it possible to remove not only the bead growth crack but also the deck growth crack by the irradiation with the laser beam, without taking away the paved portion on the steel floor slab, in the case where the crack beginning at the non-welded portion of the root part is generated at the joining portion between the deck plate and the side edge of the U-rib in the steel floor slab, for example.

Means for Solving the Problems

A first aspect of the present disclosure is a repairing laser welding method for melting and eliminating a crack by irradiation with a laser beam, the crack being generated beginning at a non-welded portion of a root part between a first welded material and a second welded material obliquely joined to a surface of the first welded material by fillet welding, in which the irradiation with the laser beam is performed along a welding bead at the root part while the laser beam is aimed at a contact point between the first welded material and the second welded material as an irradiation point of the laser beam, from a side of the welding bead, the contact point being contained in the non-welded portion of the root part.

The position of the contact point between the first welded material and the second welded material that is contained in the non-welded portion of the root part is identified by non-destructive inspection.

Effects of the Disclosure

The repairing laser welding method according to the present disclosure exerts a very excellent effect of making it possible to remove not only the bead growth crack but also the deck growth crack by the irradiation with the laser beam, without taking away the paved portion on the steel floor slab, in the case where the crack beginning at the non-welded portion of the root part is generated at the joining portion between the deck plate and the side edge of the U-rib in the steel floor slab, for example.

BRIEF DESCRIPTION OF THE DRAWINGS

FIG. 6 is a partial enlarged sectional view showing a relation between the laser beam irradiation point in FIG. 5 and repair condition.

FIG. 11 is an explanatory lateral view of the repairing laser welding device in FIG. 10A.

MODE FOR CARRYING OUT THE DISCLOSURE

Embodiments of the present disclosure will be explained below based on the drawings.

Figure 1:
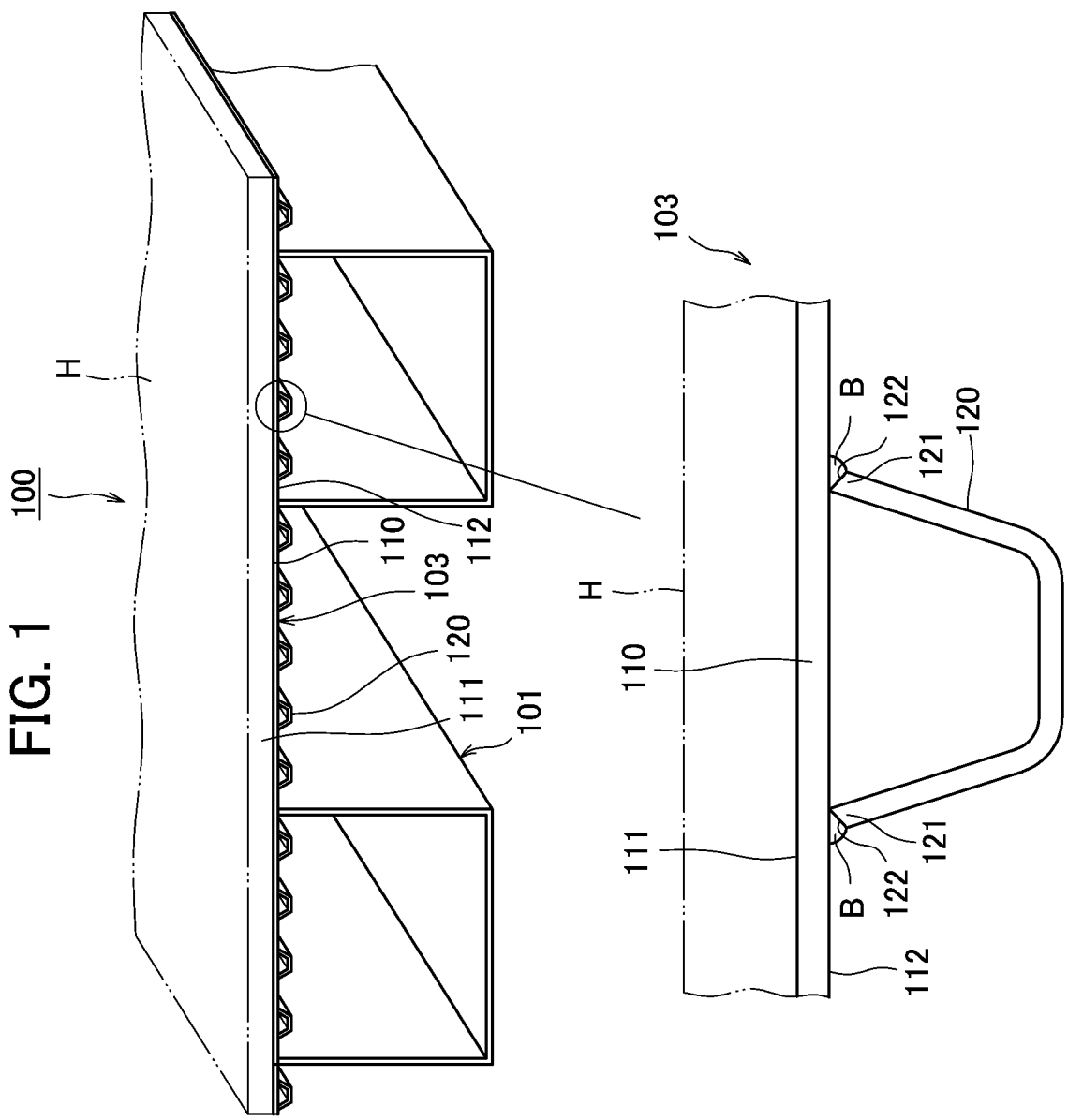
FIG. 1 is a perspective view showing a steel floor slab to which a repairing laser welding method according to an embodiment of the present disclosure is applied and showing a state where the steel floor slab is built in a steel floor slab box girder of a bridge.
Figure 2:
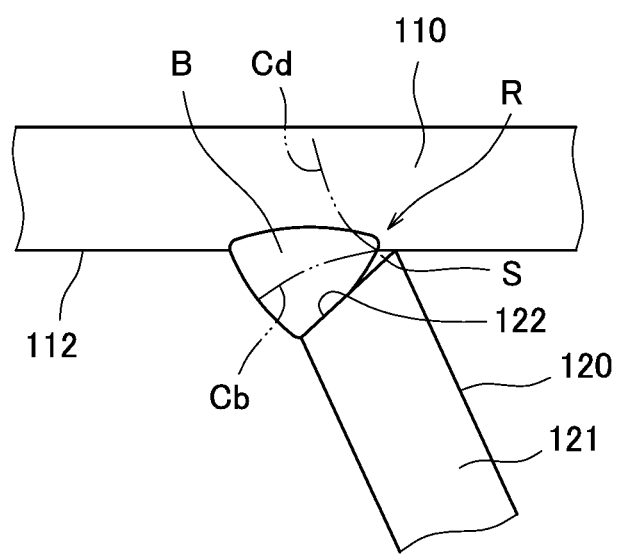
FIG. 2 is a partial enlarged elevational view in which a part of the steel floor slab in FIG. 1 is enlarged and shown.
Figure 3:
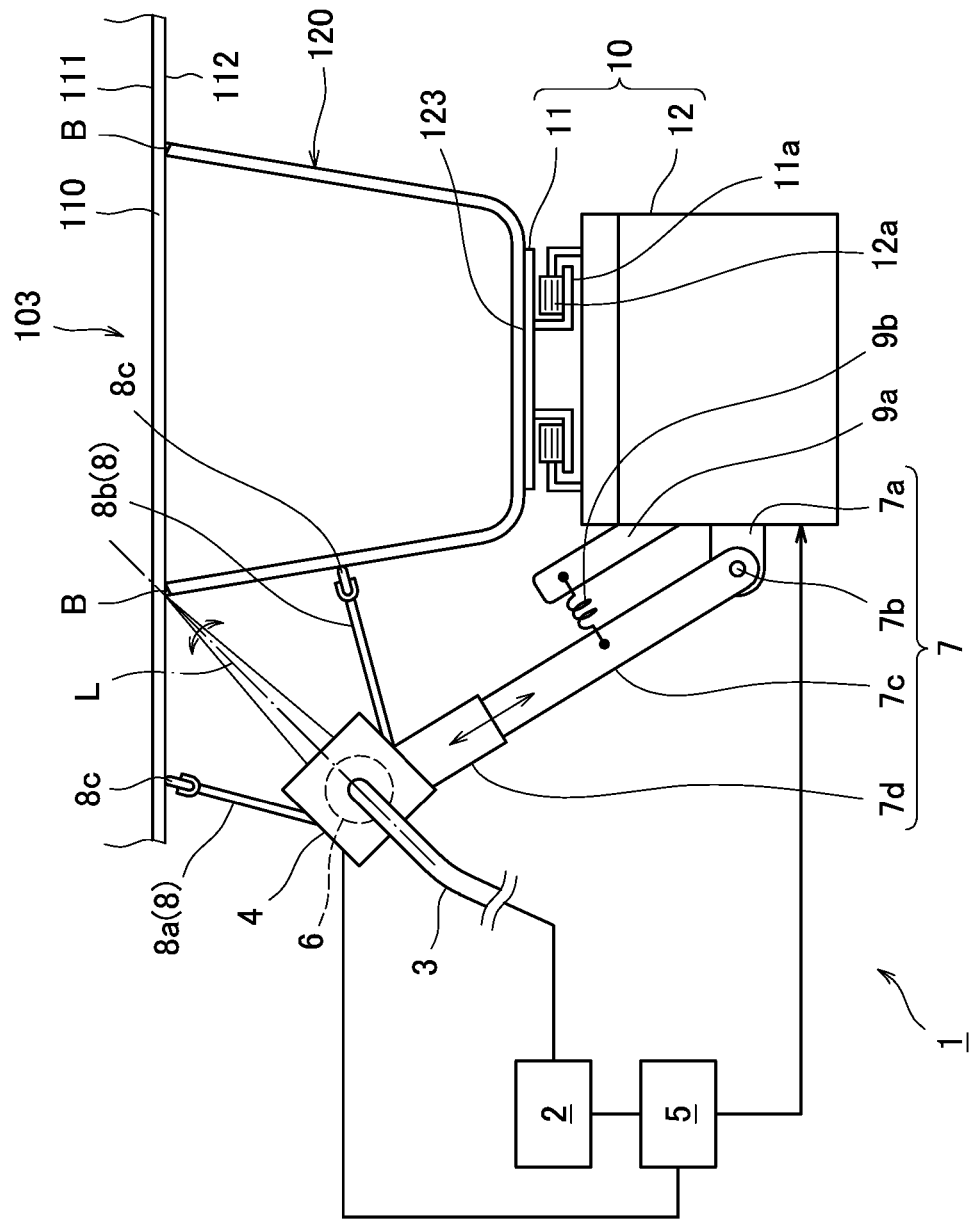
FIG. 3 is an explanatory elevational view for schematically explaining a repairing laser welding device that is used in the repairing laser welding method according to the embodiment of the present disclosure.
Figure 4:
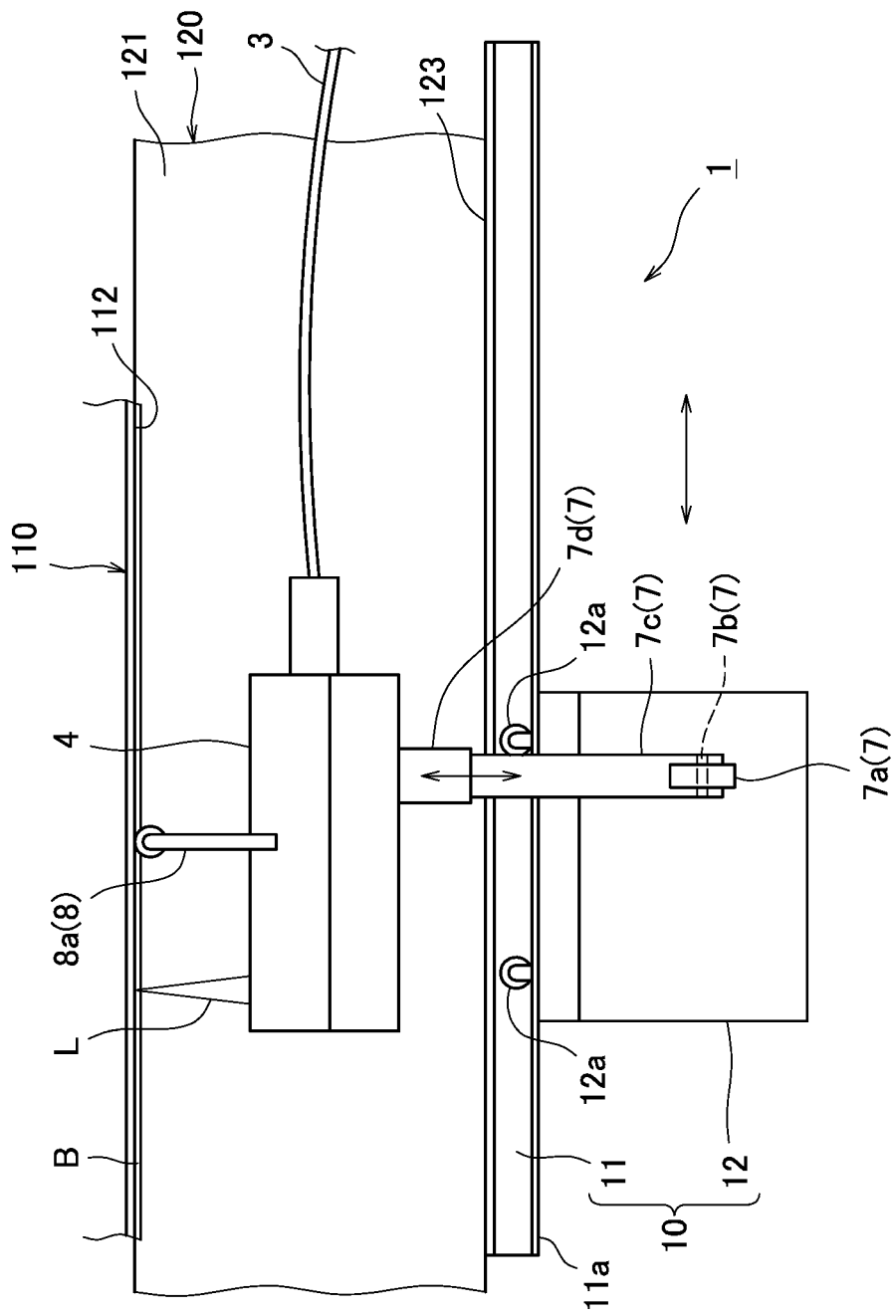
FIG. 4 is an explanatory lateral view of the repairing laser welding device in FIG. 3.

FIG. 1 and FIG. 2 show a steel floor slab in a steel floor slab box girder of a bridge to which a repairing laser welding method according to the present disclosure is applied, and FIG. 3 and FIG. 4 show a repairing laser welding device that is used in a repairing laser welding method according to an embodiment of the present disclosure.

As shown in FIG. 1, a steel floor slab 103 that constitutes a steel floor slab box girder 100 together with a plurality of main girders 101 includes a deck plate (a first welded material) 110 on which a paved portion H of the bridge is placed, and a plurality of U-ribs (second welded materials) 120 that is disposed on a downward-facing surface 112 on the opposite side of a paved portion placement surface 111 of the deck plate 110.

As also shown in an enlargement circle in FIG. 1, single bevel grooves 122, 122 are respectively formed at distal ends of a pair of side edges 121, 121 of the U-rib 120 that obliquely abuts on the downward-facing surface 112 of the deck plate 110. The U-rib 120 is attached to the deck plate 110 by forming welding beads B by fillet arc welding between the single bevel grooves 122, 122 and the downward-facing surface 112 of the deck plate 110 over the entire length, and thereby forming a closed section structure together with the deck plate 110.

On this occasion, as shown in FIG. 2, a non-welded portion S remains at a root part R of a joining portion between the deck plate 110 and the side edges 121, 121 of the U-rib 120 obliquely joined to the downward-facing surface 112 of the deck plate, and cracks (a deck growth crack Cd that grows in a direction of piercing the deck plate 110 and a bead growth crack Cb that grows in a direction of piercing the welding bead B at the joining portion) beginning at the non-welded portion S can be generated at the joining portion between the deck plate 110 and the U-rib 120, due to aging deterioration or metallic fatigue.

A repairing laser welding device 1 according to the embodiment that removes these cracks Cd, Cb generated at the joining portion between the deck plate 110 and the U-rib 120 includes a laser oscillator 2, a laser head 4 that condenses a laser beam L supplied from the laser oscillator 2 through an optical fiber 3 and that irradiates a repair location, and a head drive mechanism 10 that moves the laser head 4 along the welding bead B, as schematically shown in FIG. 3 and FIG. 4.

The head drive mechanism 10 includes a rail base 11 that is attached and fixed to a bottom 123 between the side edges 121, 121 of the U-rib 120 by a magnet or the like, and a carriage 12 that runs with the laser head 4 equipped through an arm 7.

In this case, wheels 12a, 12a of the carriage 12 are placed on rails 11a, 11a of the rail base 11, and thereby the carriage 12 is suspended and supported by the rail base 11. By dynamic power from an unillustrated motor equipped in the carriage 12, the carriage 12 runs on the rails 11a, 11a, that is, runs along the welding bead B.

Further, the repairing laser welding device 1 includes a tracing mechanism 8 that causes the irradiation point of the laser beam L that is emitted from the laser head 4 that is moved along the welding bead B by the head drive mechanism 10, to trace the joining portion between the deck plate 110 and the U-rib 120.

The tracing mechanism 8 includes two tracing legs 8a, 8b each of which is disposed at the laser head 4 and includes a roller 8c at the distal end, a sub-arm 9a provided on the carriage 12, and a tension-spring 9b. In the tracing mechanism 8, the tension-spring 9b is disposed between the sub-arm 9a and the arm 7, and presses the two tracing legs 8a, 8b against the downward-facing surface 112 of the deck plate 110 and the side edge 121 of the U-rib 120 respectively, so that the irradiation point of the laser beam L that is emitted from the laser head 4 traces the joining portion between the deck plate 110 and the U-rib 120.

The tracing mechanism that causes the irradiation point of the laser beam L to trace the joining portion between the deck plate 110 and the U-rib 120 is not limited to the above configuration. For example, a non-contact-type tracing mechanism with a sensor may be used.

Furthermore, the repairing laser welding device 1 includes a weaving mechanism 6 that is incorporated in the laser head 4, and can perform the weaving with the laser beam L in a direction crossing the welding bead B in a range of an arrow in FIG. 3.

Moreover, the repairing laser welding device 1 includes a shift mechanism. In this embodiment, the arm 7 supporting the laser head 4 serves also as the shift mechanism. Specifically, the arm 7 is constituted by a support arm 7a that is provided on the carriage 12, an arm body 7c that is linked with the support arm 7a through a pin 7b so as to be capable of pivoting, and a movement arm 7d that is fit to the arm body 7c and provided on the laser head 4 side so as to be capable of moving in the axial direction (the arrow direction in the figure).

That is, the arm 7 that serves also as the shift mechanism moves the movement arm 7d relative to the arm body 7c linked with the support arm 7a so as to be capable of pivoting, and thereby can shift the irradiation point of the laser beam L from the root part R of the joining portion between the deck plate 110 and the U-rib 120, to the welding bead B side.

Reference numeral 5 in FIG. 3 denotes a control unit, and the control unit 5 controls the spot diameter of the laser beam L that is emitted from the laser head 4, the movement of the laser head 4 by the head drive mechanism 10, and the like.

Figure 5:
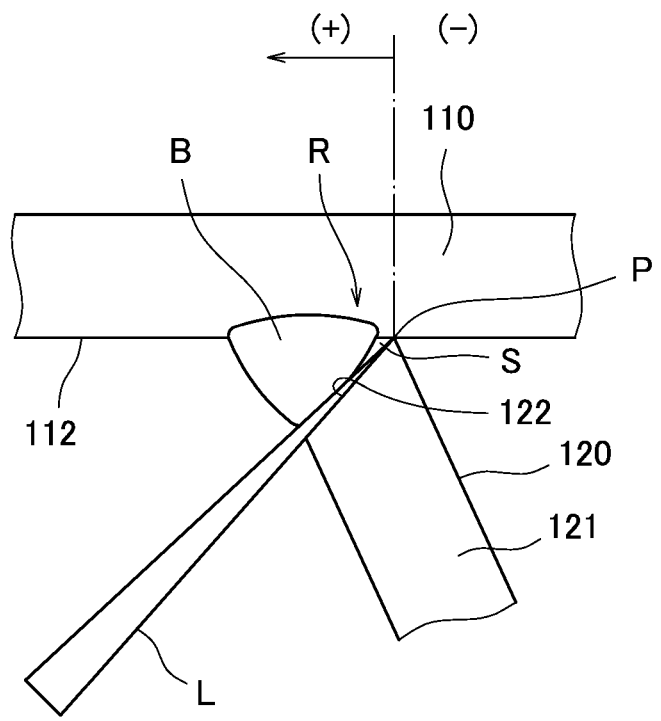
FIG. 5 is a partial enlarged elevational view of a site corresponding to FIG. 2, and shows a laser beam irradiation point in the repairing laser welding method according to the embodiment of the present disclosure.

When the deck growth crack Cd generated at the joining portion between the deck plate 110 and the U-rib 120 in the steel floor slab 103 is removed using the repairing laser welding device 1 configured in the above way, first, a non-destructive inspection such as an ultrasonic test is performed to the joining portion between the deck plate 110 and the U-rib 120, and the position of a contact point P that is the contact point between the downward-facing surface 112 of the deck plate 110 and the single bevel groove 122 at the side edge 121 of the U-rib 120 and that is contained in the non-welded portion S of the root part R is identified, as shown in FIG. 5.

Next, the angle of the arm body 7c of the arm 7 (the shift mechanism) supporting the laser head 4 is adjusted, and the movement arm 7d is moved relative to the arm body 7c. Thereby, the irradiation point of the laser beam L is determined such that the laser beam L contacts with the above contact point P.

Then, the two tracing legs 8a, 8b are set so as to be pressed against the downward-facing surface 112 of the deck plate 110 and the side edge 121 of the U-rib 120 by the tension-spring 9b of the tracing mechanism 8, respectively.

Thereafter, the carriage 12 of the head drive mechanism 10 starts to run in response to a command from the control unit 5, and the laser head 4 starts to move while irradiating the above contact point P with the laser light L having an appropriate spot diameter.

In the embodiment, by the movement of the laser head 4, the laser beam L passes (moves) along the welding bead B once.

In the case where the bead growth crack Cb generated at the joining portion between the deck plate 110 and the U-rib 120 in the steel floor slab 103 is removed using the repairing laser welding device 1 having the above configuration, the laser head 4 is moved while irradiating the welding bead B with the laser beam L.

In the repairing laser welding method according to the embodiment, the laser beam L is aimed, as the irradiation point, at the contact point P that is the contact point between the downward-facing surface 112 of the deck plate 110 and the single bevel groove 122 at the side edge 121 of the U-rib 120 in the steel floor slab 103 and that is contained in the non-welded portion S of the root part R, and therefore it is possible to melt the non-welded portion S of the root part R. Then, with the melting of the non-welded portion S, the deck growth crack Cd generated beginning at the non-welded portion S is molten and removed.

FIG. 6 is a partial enlarged sectional view showing a relation between the laser beam irradiation point and repair condition, and shows the repair condition when the laser beam L passes along the welding bead B once.

When the irradiation point of the laser beam L is set to the inside (less than 0 (−)) of the U-rib 120 relative to the above contact point P in FIG. 5, the molten metal of a welding bead BL due to the irradiation with the laser beam L flows to the inside of the U-rib 120, and a hole is generated in the side edge 121 of the U-rib 120, as shown in the partial enlarged sectional view of FIG. 6.

On this occasion, even when the focal point of the laser beam L is set so as to coincide with the above contact point P, the outer edge of the spot of the laser beam L actually enters the inside (the region of less than 0 (−)) of the U-rib 120.

Accordingly, it is preferable to set the irradiation point of the laser beam L such that at least the outer edge of the spot of the laser beam L contacts with the contact point P, and by setting the irradiation point of the laser beam L in this way, it is possible to surely prevent the flow of the molten metal due to the irradiation with the laser beam L to the inside of the U-rib 120.

On the other hand, when the irradiation point of the laser beam L is set excessively to the welding bead B side (4 mm +) relative to the above contact point P, the welding bead BL due to the irradiation with the laser beam L does not reach the non-welded portion S, and therefore a remaining non-welded portion is generated, as shown in the partial enlarged sectional view of FIG. 6.

Accordingly, in the embodiment in which the laser beam L passes along the welding bead B once, it is found that it is preferable to set the irradiation point of the laser beam L to the welding bead B side that is about 2 mm away from the above contact point P.

Figure 7A:
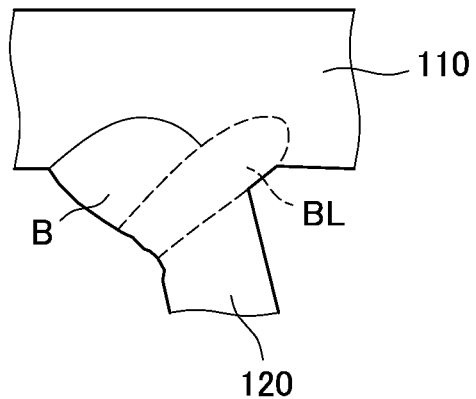
FIG. 7A is a partial enlarged sectional view showing a relation between the laser beam irradiation passing number in the repairing laser welding method according to the embodiment of the present disclosure and the repair condition.
Figure 7B:
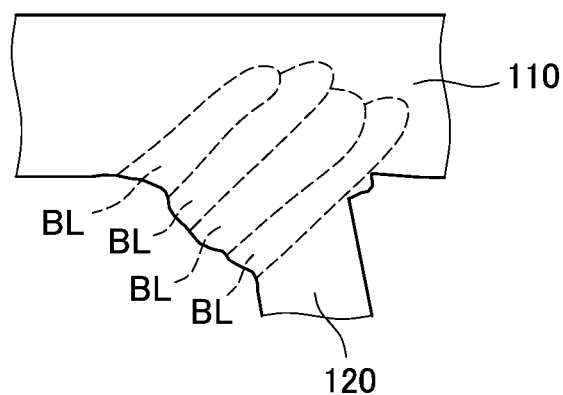
FIG. 7B is a partial enlarged sectional view showing a relation between the laser beam irradiation passing number in the repairing laser welding method according to the embodiment of the present disclosure and the repair condition.

Further, when the deck growth crack Cd is small, it is possible to remove the deck growth crack Cd, simply by causing the laser beam L to pass along the welding bead B once and forming the welding bead BL due to the irradiation of the laser beam L, as shown in a partial enlarged sectional view of FIG. 7A. When the deck growth crack Cd is large, it is possible to remove the deck growth crack Cd by performing the passing multiple times while the irradiation point of the laser beam L is shifted from the root part R of the joining portion between the deck plate 110 and the U-rib 120 to the welding bead B side by the arm 7 that serves as the shift mechanism (by forming a plurality of welding beads BL due to the irradiation with the laser beam L), as shown in a partial enlarged sectional view of FIG. 7B.

Figure 7C:
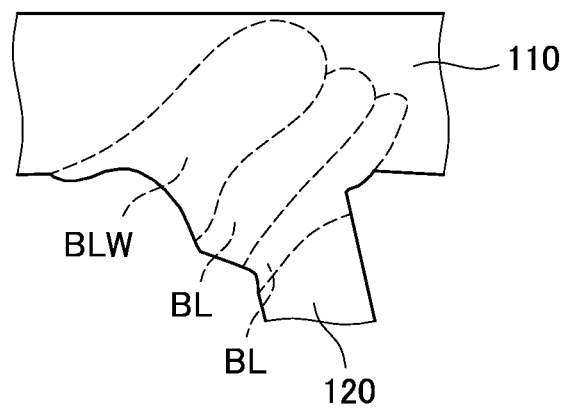
FIG. 7C is a partial enlarged sectional view showing a relation between the laser beam irradiation passing number in the repairing laser welding method according to the embodiment of the present disclosure and the repair condition.

On this occasion, it is possible to reduce the risk of hot cracking by causing the weaving mechanism 6 to perform the weaving with the laser beam L and forming a wide welding bead BLW due to the irradiation with the laser beam L, as shown in a partial enlarged sectional view of FIG. 7C.

Figure 8:
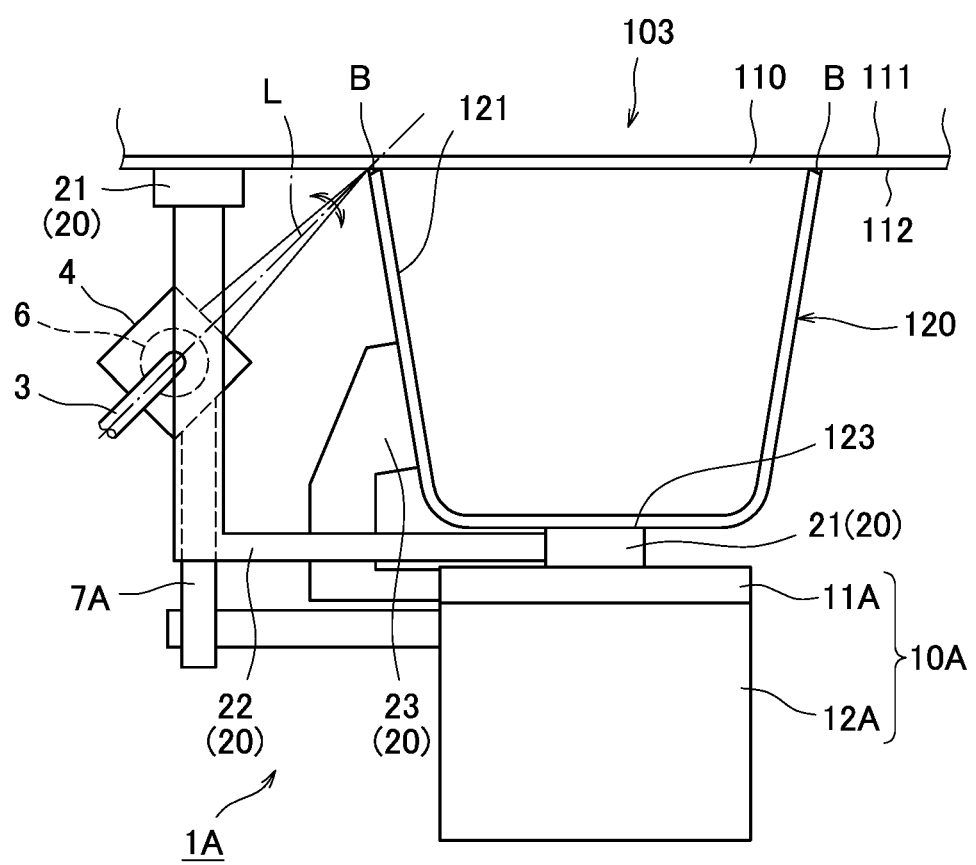
FIG. 8 is an explanatory elevational view for schematically explaining a repairing laser welding device that is used in a repairing laser welding method according to another embodiment of the present disclosure.
Figure 9:
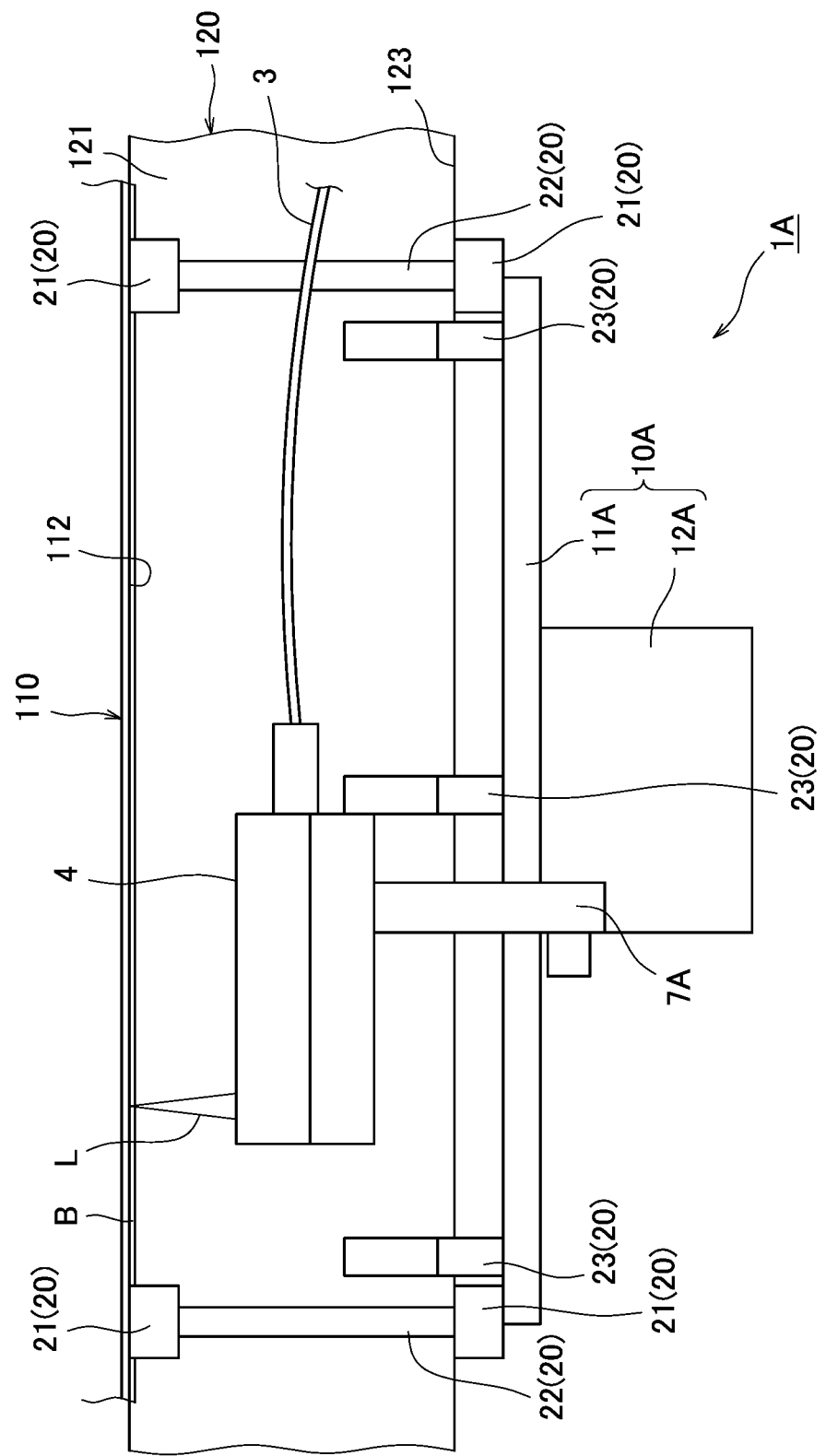
FIG. 9 is an explanatory lateral view of the repairing laser welding device in FIG. 8.

FIG. 8 and FIG. 9 show a repairing laser welding device that is used in a repairing laser welding method according to another embodiment of the present disclosure.

As schematically shown in FIG. 8 and FIG. 9, a repairing laser welding device 1A according to the embodiment includes the laser head 4 that condenses the laser beam L supplied from an unillustrated laser oscillator through the optical fiber 3 and irradiates a repair location, and a head drive mechanism 10A that moves the laser head 4 along the welding bead B.

In the embodiment, the head drive mechanism 10A includes a rail 11A and a carriage 12A that runs on the rail 11A, and the laser head 4 is equipped in the carriage 12A through an arm 7A.

The repairing laser welding device 1A according to the embodiment includes a rail disposition mechanism 20, and the rail disposition mechanism 20 includes an L-shaped member 22 on which magnets 21, 21 are disposed at both ends and a guide 23 that is disposed on the rail 11A of the head drive mechanism 10A.

The rail 11A of the head drive mechanism 10A is fixed to the bottom 123 of the U-rib 120 through one magnet 21 of the L-shaped member 22 of the rail disposition mechanism 20. On this occasion, the other magnet 21 of the L-shaped member 22 is attached to the downward-facing surface 112 (the surface of the first welded material to which the second welded material is joined) of the deck plate 110, and the guide 23 abuts on the side edge 121 of the U-rib 120.

That is, the rail 11A of the head drive mechanism 10A is fixed with reference to both the downward-facing surface 112 of the deck plate 110 and the side edge 121 of the U-rib 120, and thereby the irradiation point of the laser beam L to be emitted from the laser head 4 that moves along the welding bead B together with the carriage 12A is aimed at the joining portion between the deck plate 110 and the U-rib 120 (at the contact point P that is the contact point between the downward-facing surface 112 of the deck plate 110 and the single bevel groove 122 at the side edge 121 of the U-rib 120 and that is contained in the non-welded portion S of the root part R in FIG. 5).

When the deck growth crack Cd generated at the joining portion between the deck plate 110 and the U-rib 120 in the steel floor slab 103 is removed using the repairing laser welding device 1A according to the embodiment, first, the non-destructive inspection such as an ultrasonic test is performed to the joining portion between the deck plate 110 and the U-rib 120, and the position of the contact point P that is the contact point between the downward-facing surface 112 of the deck plate 110 and the single bevel groove 122 at the side edge 121 of the U-rib 120 and that is contained in the non-welded portion S of the root part R is identified, as shown in FIG. 5.

Next, by attaching the other magnet 21 of the L-shaped member 22 of the rail disposition mechanism 20 to the downward-facing surface 112 of the deck plate 110 and causing the guide 23 to abut on the side edge 121 of the U-rib 120, that is, with reference to both the downward-facing surface 112 of the deck plate 110 and the side edge 121 of the U-rib 120, the rail 11A of the head drive mechanism 10A is fixed to the bottom 123 of the U-rib 120 through the one magnet 21 of the L-shaped member 22.

Thereby, the irradiation point of the laser beam L to be emitted from the laser head 4 that moves along the welding bead B together with the carriage 12A is set to the contact point P that is contained in the non-welded portion S of the root part R of the joining portion between the deck plate 110 and the U-rib 120.

Thereafter, the carriage 12A of the head drive mechanism 10A starts to run, and the laser head 4 starts to move while irradiating the above contact point P with the laser light L having an appropriate spot diameter. In the embodiment also, by the movement of the laser head 4, the laser beam L passes (moves) along the welding bead B once.

On the other hand, in the case where the bead growth crack Cb generated at the joining portion between the deck plate 110 and the U-rib 120 in the steel floor slab 103 is removed using the repairing laser welding device 1A having the above configuration, the laser head 4 is moved while the welding bead B is irradiated with the laser beam L.

In the repairing laser welding method according to the embodiment also, the laser beam L is aimed, as the irradiation point, at the contact point P that is the contact point between the downward-facing surface 112 of the deck plate 110 and the single bevel groove 122 at the side edge 121 of the U-rib 120 in the steel floor slab 103 and that is contained in the non-welded portion S of the root part R, and therefore it is possible to melt the non-welded portion S of the root part R. Then, with the melting of the non-welded portion S, the deck growth crack Cd generated beginning at the non-welded portion S is molten and removed.

Figure 10A:
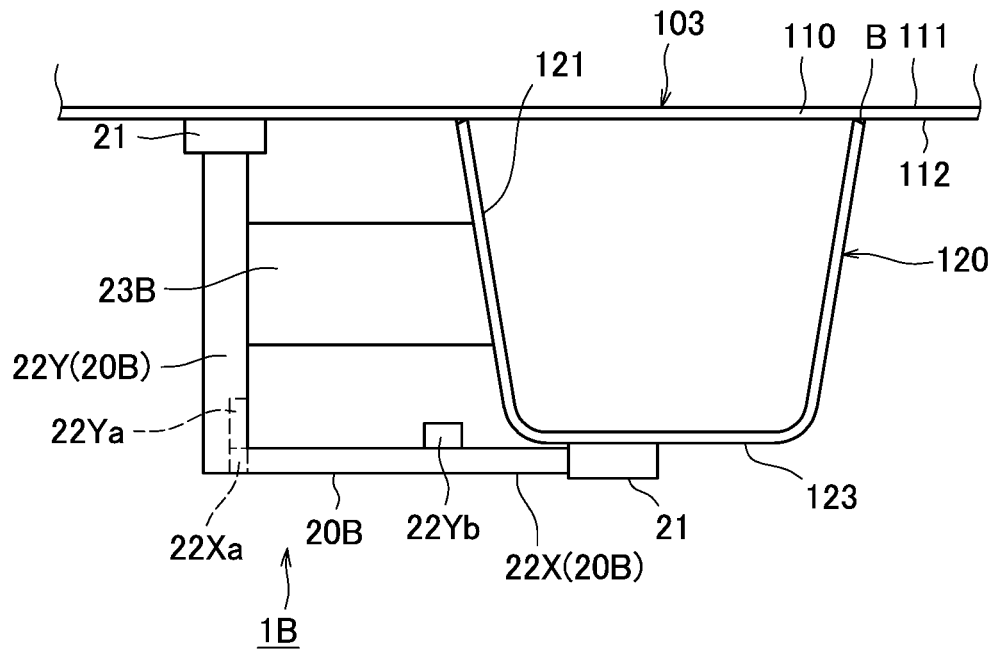
FIG. 10A is an explanatory elevational view at the time of rail positioning for schematically explaining a repairing laser welding device that is used in a repairing laser welding method according to still another embodiment of the present disclosure.
Figure 10B:
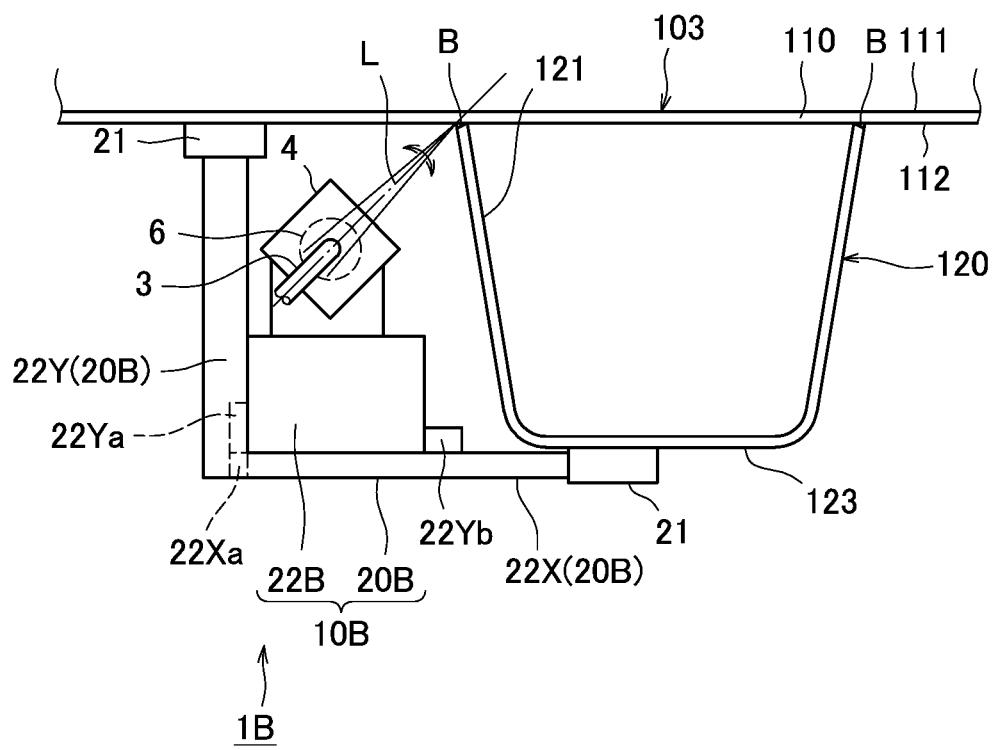
FIG. 10B is an explanatory elevational view at the time of repair welding for schematically explaining the repairing laser welding device that is used in the repairing laser welding method according to still another embodiment of the present disclosure.

FIG. 10A, FIG. 10B and FIG. 11 show a repairing laser welding device that is used in a repairing laser welding method according to still another embodiment of the present disclosure.

As schematically shown in FIG. 10A, FIG. 10B and FIG. 11, a repairing laser welding device 1B according to the embodiment includes the laser head 4 that condenses the laser beam L supplied from an unillustrated laser oscillator through the optical fiber 3 and irradiates a repair location, and a head drive mechanism 10B that moves the laser head 4 along the welding bead B.

The head drive mechanism 10B includes a rail 20B and a carriage 22B that is equipped with the laser head 4. In this case, the rail 20B has an angle steel shape, and includes a vertical plate material 22Y and a horizontal plate material 22X that are coupled so as to be capable of being separated from each other.

The vertical plate material 22Y of the rail 20B includes a magnet 21 on each upper end at both end parts in the longitudinal direction (the right-left direction in FIG. 11), and the vertical plate material 22Y is fixed to the downward-facing surface 112 (the surface of the first welded material to which the second welded material is joined) of the deck plate 110 through the magnet 21.

Further, a groove 22Ya along the top-bottom direction is formed on each lower end part at both end parts in the longitudinal direction of the vertical plate material 22Y.

In the embodiment, when the vertical plate material 22Y is fixed, as shown in FIG. 10A, a guide 23B is interposed between the vertical plate material 22Y and the side edge 121 of the U-rib 120, and thereby the positioning relative to the U-rib 120 is performed.

The guide 23B is interposed at an appropriate position in the longitudinal direction of the vertical plate material 22Y, for example, at both end parts, and is removed after the fixation of the vertical plate material 22Y.

On the other hand, the horizontal plate material 22X of the rail 20B includes a groove insertion protrusion 22Xa that is inserted into the groove 22Ya of the vertical plate material 22Y, at a base end part (at a left end part in FIG. 10A), and includes a magnet 21 at each distal end (at a right end in FIG. 10A) at both end parts in the longitudinal direction (the right-left direction in FIG. 11).

The horizontal plate material 22X is fixed to the bottom 123 of the U-rib 120 through the magnet 21 in a state where the groove insertion protrusion 22Xa is inserted into the groove 22Ya of the vertical plate material 22Y. On this occasion, the vertical position of the groove insertion protrusion 22Xa relative to the groove 22Ya of the vertical plate material 22Y is adjusted, and thereby the positioning is performed with reference to the downward-facing surface 112 (the surface of the first welded material to which the second welded material is joined) of the deck plate 110.

A long member 22Yb is disposed on the horizontal plate material 22X, parallel to the vertical plate material 22Y, and forms a running path between the vertical plate material 22Y and the long member 22Yb on the horizontal plate material 22X. As shown in FIG. 10B, the carriage 22B of the head drive mechanism 10B runs along the running path on the horizontal plate material 22X to which the positioning has been performed, while being guided by the vertical plate material 22Y to which the positioning has been similarly performed and the long member 22Yb.

That is, the irradiation point of the laser beam L to be emitted from the laser head 4 that moves along the welding bead B together with the carriage 22B is aimed at the joining portion between the deck plate 110 and the U-rib 120 (at the contact point P that is the contact point between the downward-facing surface 112 of the deck plate 110 and the single bevel groove 122 at the side edge 121 of the U-rib 120 and that is contained in the non-welded portion S of the root part R in FIG. 5).

When the deck growth crack Cd generated at the joining portion between the deck plate 110 and the U-rib 120 in the steel floor slab 103 is removed using the repairing laser welding device 1B according to the embodiment, first, the non-destructive inspection such as an ultrasonic test is performed to the joining portion between the deck plate 110 and the U-rib 120, and the position of the contact point P that is the contact point between the downward-facing surface 112 of the deck plate 110 and the single bevel groove 122 at the side edge 121 of the U-rib 120 and that is contained in the non-welded portion S of the root part R is identified, as shown in FIG. 5.

Next, the vertical plate material 22Y of the rail 20B is fixed to the downward-facing surface 112 (the surface of the first welded material to which the second welded material is joined) of the deck plate 110 through the magnet 21, in a state where the guide 23B is interposed between the vertical plate material 22Y of the rail 20B and the side edge 121 of the U-rib 120. That is, the vertical plate material 22Y of the rail 20B is fixed to the downward-facing surface 112 of the deck plate 110 in a state where the positioning relative to the U-rib 120 has been performed.

Subsequently, the horizontal plate material 22X is fixed to the bottom 123 of the U-rib 120 through the magnet 21, in the state where the groove insertion protrusion 22Xa of the horizontal plate material 22X is inserted into the groove 22Ya of the vertical plate material 22Y. On this occasion, the vertical position of the groove insertion protrusion 22Xa relative to the groove 22Ya of the vertical plate material 22Y is adjusted, and the positioning is performed with reference to the downward-facing surface 112 (the surface of the first welded material to which the second welded material is joined) of the deck plate 110.

Thereby, the running path for the carriage 22B that runs while being guided by the vertical plate material 22Y and the long member 22Yb (along the welding bead B) is set to the horizontal plate material 22X, and the irradiation point of the laser beam L to be emitted from the laser head 4 on the carriage 22B is set to the contact point P that is contained in the non-welded portion S of the root part R of the joining portion between the deck plate 110 and the U-rib 120.

Next, the guide 23B is removed from between the vertical plate material 22Y of the rail 20B and the side edge 121 of the U-rib 120. Thereafter, the carriage 22B of the head drive mechanism 10B starts to run, and the laser head 4 starts to move while irradiating the above contact point P with the laser light L having an appropriate spot diameter.

In the embodiment also, by the movement of the laser head 4, the laser beam L passes (moves) along the welding bead B once.

On the other hand, in the case where the bead growth crack Cb generated at the joining portion between the deck plate 110 and the U-rib 120 in the steel floor slab 103 is removed using the repairing laser welding device 1B having the above configuration, the laser head 4 is moved while the welding bead B is irradiated with the laser beam L.

In the repairing laser welding method according to the embodiment also, the laser beam L is aimed, as the irradiation point, at the contact point P that is the contact point between the downward-facing surface 112 of the deck plate 110 and the single bevel groove 122 at the side edge 121 of the U-rib 120 in the steel floor slab 103 and that is contained in the non-welded portion S of the root part R, and therefore it is possible to melt the non-welded portion S of the root part R. Then, with the melting of the non-welded portion S, the deck growth crack Cd generated beginning at the non-welded portion S is molten and removed.

Further, in the repairing laser welding device 1B according to the embodiment, the rail 20B is constituted by the vertical plate material 22Y and the horizontal plate material 22X that are coupled so as to be capable of being separated from each other, and therefore at the time of the installation of the rail 20B, the rail 20B is installed while the positioning of the vertical plate material 22Y and the horizontal plate material 22X is performed relative to the downward-facing surface 112 of the deck plate 110 and the U-rib 120 one by one.

That is, it is possible to perform individual works without enduring much weight, and as a result, the workability is improved since the positioning and installation of the rail 20B are facilitated.

Furthermore, in the repairing laser welding device 1B according to the embodiment, the running path for the carriage 22B is set to the horizontal plate material 22X of the rail 20B, and therefore a targeting work for the laser beam L to be emitted from the laser head 4 is readily performed.

Figure 12A:
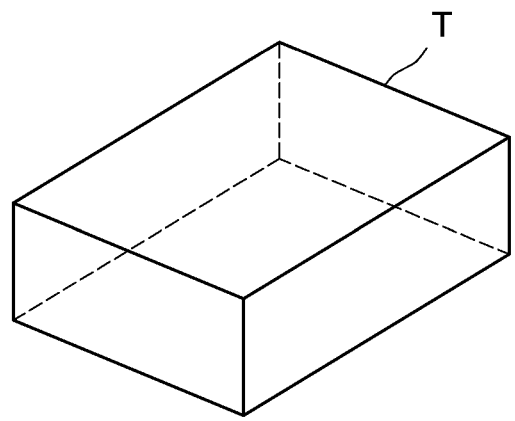
FIG. 12A is an explanatory perspective view of a tab plate when the tab plate is used at a starting end and a terminating end for laser welding in the repairing laser welding method according to the present disclosure.
Figure 12B:
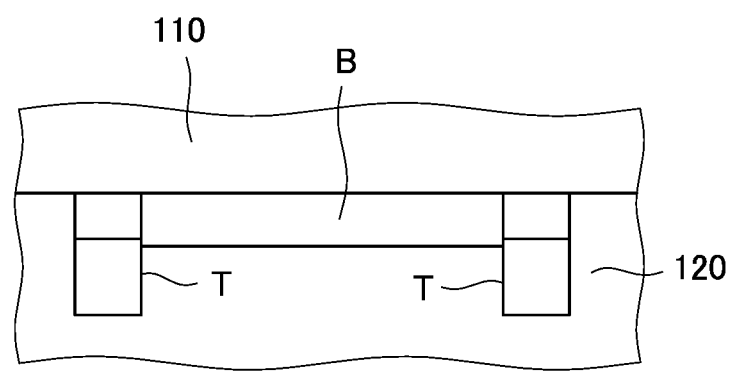
FIG. 12B is an explanatory external view of a welding bead showing an exemplary disposition of the tab plate when the tab plate is used at the starting end and the terminating end for the laser welding in the repairing laser welding method according to the present disclosure.
Figure 12C:
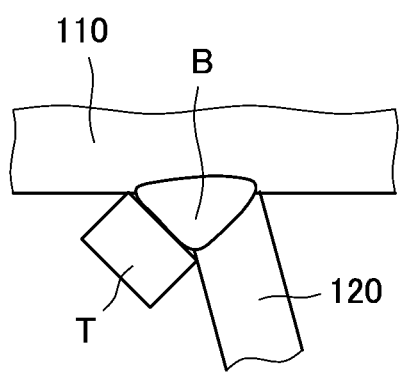
FIG. 12C is a partial enlarged elevational view of the site corresponding to FIG. 2 when the tab plate is used at the starting end and the terminating end for the laser welding in the repairing laser welding method according to the present disclosure.

In the repairing laser welding method according to the embodiment, in the case where the bead growth crack generated at the joining portion between the deck plate 110 and the U-rib 120 is removed by the irradiation with the laser beam L, the laser welding is performed while a tab plate T having a rectangular parallelepiped shape shown in FIG. 12A is disposed at two locations of a starting end and a terminating end of the repair welding location in the welding bead B, as shown in FIG. 12B and FIG. 12C, and the tab plates T, T are removed after the finish of the laser welding for repair.

By performing the laser welding while the tab plates T, T are disposed at the starting end and terminating end of the repair welding location in the welding bead B in this way, it is possible to secure the soundness of the starting end and the terminating end of the repair welding location in the welding bead B that have high defect generation rate.

Figure 13A:
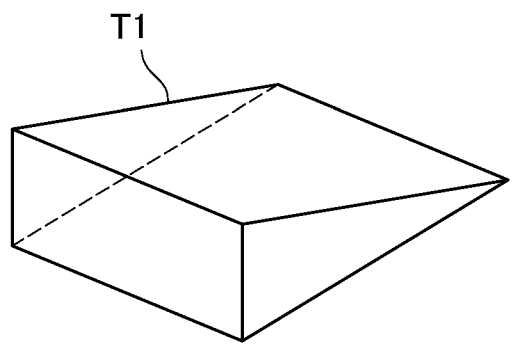
FIG. 13A is an explanatory perspective view showing another exemplary shape of the tab plate in FIG. 12A.
Figure 13B:
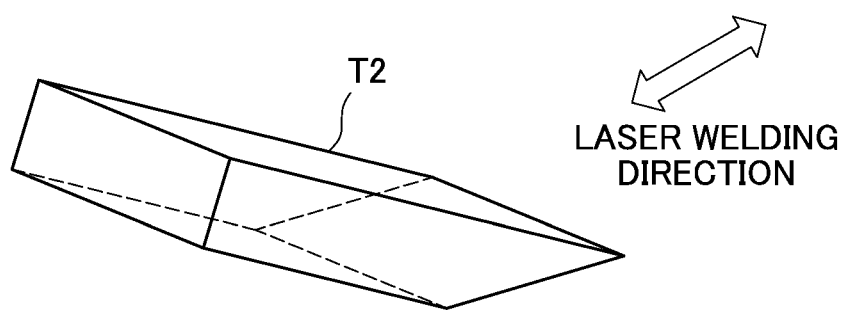
FIG. 13B is an explanatory perspective view showing still another exemplary shape of the tab plate in FIG. 12A.

In the embodiment, as the tab plate that is disposed at the starting end and the terminating end of the repair welding location in the welding bead B, a tab plate T1 having a wedge shape shown in FIG. 13A and a tab plate T2 having a trapezoidal shape in lateral view shown in FIG. 13B can be used in place of the tab plate T having a rectangular parallelepiped shape.

Figure 14:
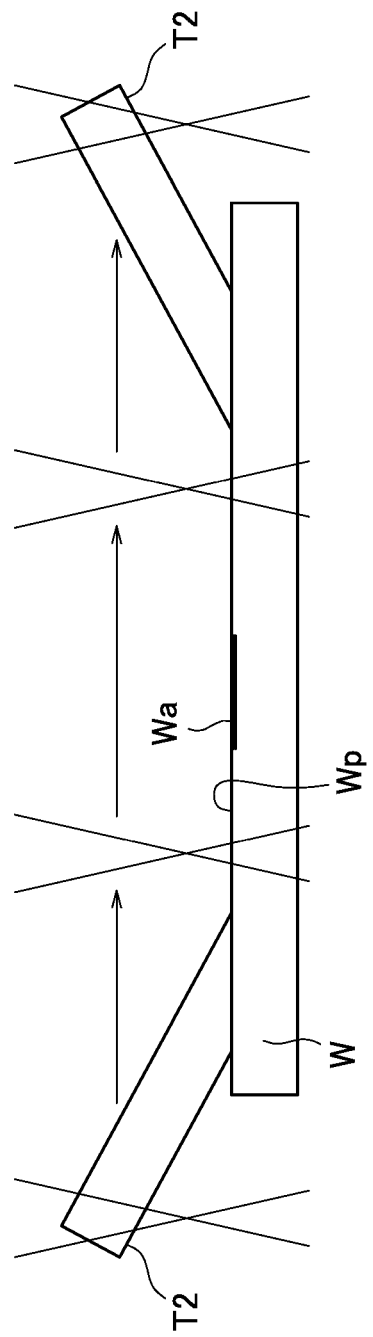
FIG. 14 is a conceptual diagram when repairing laser welding is performed using the tab plate in FIG. 13B.

For example, in the case where the repairing laser welding is performed using the tab plate T2 having a trapezoidal shape in lateral view, two tab plates T2, T2 are disposed on the surface of a steel material W so as to sandwich a crack Wa, as shown in FIG. 14. Then, one side surfaces of the tab plates T2, T2 that are obliquely cut are caused to contact with a surface Wp of the steel material W, the other side surfaces are inclined so as to be away from each other, and joining is performed by spot welding, for example.

Next, the irradiation with the laser beam L is started such that heat is input from the side surface (so-called edge surface) of the tab plate T2 on one side (left side in the figure) that is held so as to contact with the surface Wp of the steel material W with an inclination.

In this case, the laser beam L is set such that the laser beam L is nearly perpendicular to the surface Wp of the steel material W and the distance is constant, and therefore the vicinity of each edge surface of the tab plates T2, T2 has a low energy density and does not melt.

Figure 15A:
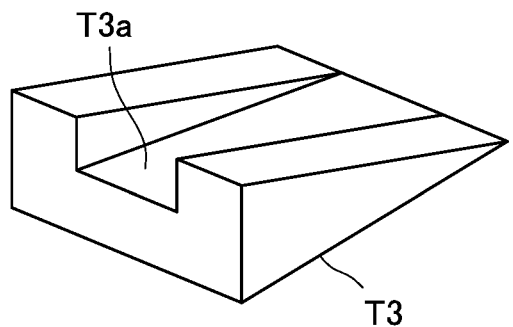
FIG. 15A is an explanatory perspective view showing an exemplary shape that is preferable to be used instead of the tab plate in FIG. 13B.
Figure 15B:
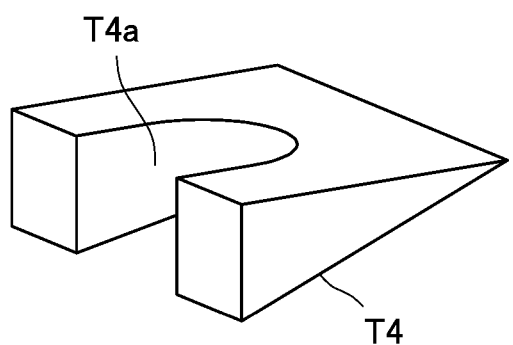
FIG. 15B is an explanatory perspective view showing another exemplary shape that is preferable to be used instead of the tab plate in FIG. 13B.
Figure 15C:
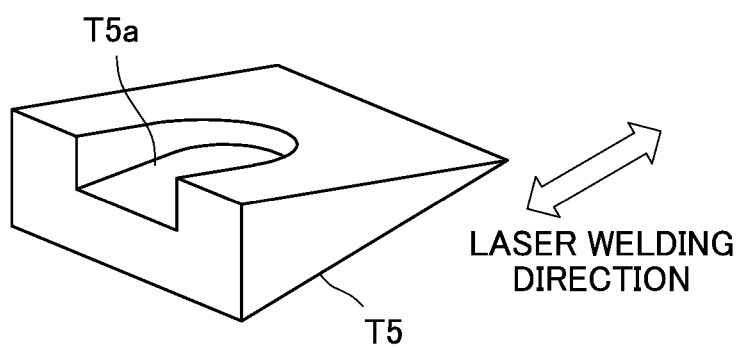
FIG. 15C is an explanatory perspective view showing still another exemplary shape that is preferable to be used instead of the tab plate in FIG. 13B.

Hence, it is preferable to prevent a temperature difference from being generated in the thickness direction of the steel material W, by employing a tab plate T3 having a groove T3a along the welding direction as shown in FIG. 15A, employing a tab plate T4 having a cutout T4a on the edge surface as shown in FIG. 15B, or employing a tab plate T5 having a step T5a on the edge surface as shown in FIG. 15C, instead of the tab plate T2 having a trapezoidal shape in lateral view.

Figure 16A:
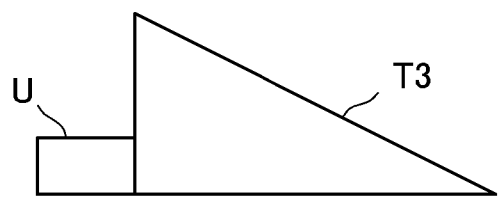
FIG. 16A is a lateral view in a state where a stiffening plate is disposed when the repairing laser welding is performed using the tab plate in FIG. 15A.
Figure 16B:
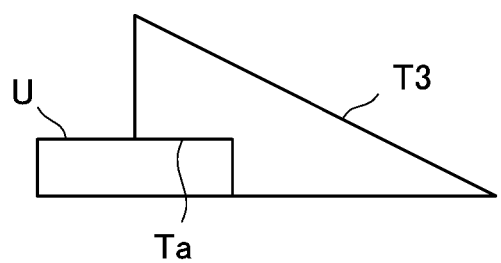
FIG. 16B is a lateral view showing another exemplary disposition in the state where the stiffening plate is disposed when the repairing laser welding is performed using the tab plate in FIG. 15A.
Figure 16C:
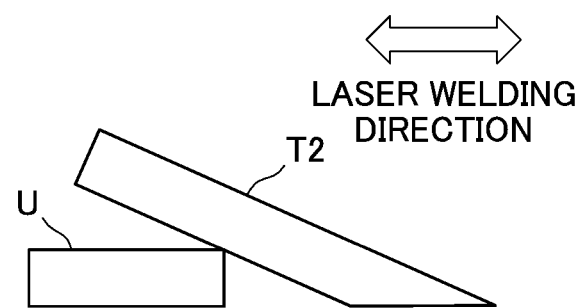
FIG. 16C is a lateral view in the state where the stiffening plate is disposed when the repairing laser welding is performed using the tab plate in FIG. 13B.

In the case where the tab plates T3 to T5 having the above groove T3a, cutout T4a and step T5a are used in the repairing laser welding, it is preferable to put a stiffening plate U formed of a steel material or ceramic on the edge surface of the tab plate T3 (T4, T5) as shown in FIG. 16A, or fit the stiffening plate U into a cutout Ta formed on the tab plate T3 (T4, T5) as shown in FIG. 16B, for avoiding a base material from melting at each time point of the laser beam irradiation start and laser beam irradiation finish, and in the case where the tab T2 having a trapezoidal shape in lateral view is used, it is preferable to put the stiffening plate U under the tab plate T2 as shown in FIG. 16C.

Figure 17A:
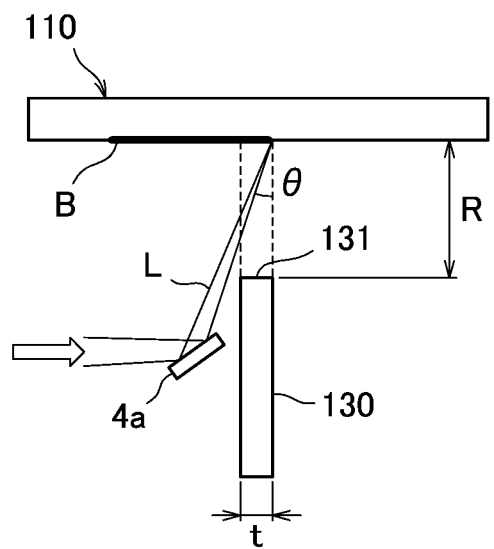
FIG. 17A is an explanatory enlarged sectional view showing a repair way for a welded portion at a location that intersects a horizontal rib of the steel floor slab to which the repairing laser welding method of the present disclosure is applied.
Figure 17B:
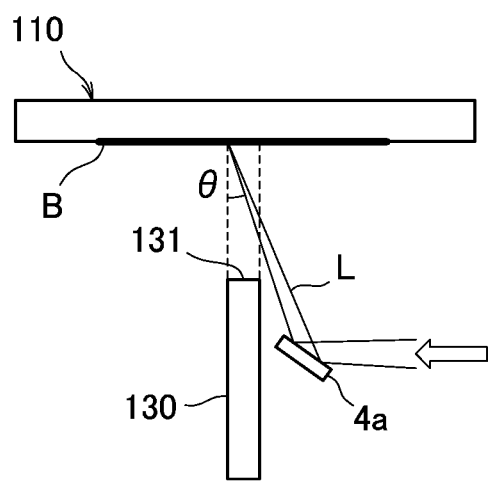
FIG. 17B is an explanatory enlarged sectional view showing the repair way for the welded portion at the location that intersects the horizontal rib of the steel floor slab to which the repairing laser welding method of the present disclosure is applied.

FIG. 17A and FIG. 17B show a case where a portion positioned at a scallop part 131 of a horizontal rib 130 disposed over the U-rib is irradiated with the laser beam L when the repairing laser welding is performed to the joining portion between the deck plate 110 and the U-rib by the repairing laser welding method according to the embodiment.

In the case where the portion positioned at the scallop part 131 of the horizontal rib 130 is irradiated with the laser beam L in this way, first, the laser head (not illustrated in FIG. 17A) that moves from the left side to the right side in the figure is stopped temporarily before the horizontal rib 130, and in this state, the portion positioned at the scallop part 131 of the horizontal rib 130 is irradiated with the laser beam L through a mirror 4a, as shown in FIG. 17A.

Thereafter, as shown in FIG. 17B, the laser head is positioned at the right side in the figure of the horizontal rib 130, and the portion positioned at the scallop part 131 is irradiated with the laser beam L from the right side in the figure of the horizontal rib 130 through the mirror 4a, that is, the portion positioned at the scallop part 131 is welded so as to be wrapped.

On this occasion, when the thickness of the horizontal rib 130 is represented as t and the distance from the deck plate 110 to the scallop part 131 is represented as R, it is preferable that the irradiation angle θ of the laser beam L with respect to the horizontal rib 130 be at least equal to or more than ½ of the tangent angle α of tan α expressed as t/R, for preventing a non-welded location from being generated at the portion positioned at the scallop part 131.

Each of the above embodiments has been explained about an example of the case where the repairing laser welding method according to the present disclosure is used for repairing the crack generated at the joining portion between the deck plate constituting the steel floor slab of the bridge and the U-rib joined to the surface of the deck plate by fillet welding, but the present disclosure is not limited to this.

Further, in each of the above embodiments, the crack is removed by only the irradiation with the laser beam L, but the present disclosure is not limited to this. As another configuration, for example, the irradiation with the laser beam L may be performed while a welding material is supplied, and in the case where the irradiation with the laser beam L is performed while the welding material is supplied in this way, it is possible to surely remove the crack.

Furthermore, in each of the above embodiments, the crack is removed by only the irradiation with the laser beam L, but another welding, for example, an arc welding may be concurrently used.

The configurations of the repairing laser welding method and repairing laser welding device according to the present disclosure are not limited to the above embodiments, and various modifications can be made without departing from the spirit of the disclosure.

A first aspect of the present disclosure is a repairing laser welding method for melting and eliminating a crack by irradiation with a laser beam, the crack being generated beginning at a non-welded portion of a root part between a first welded material and a second welded material obliquely joined to a surface of the first welded material by fillet welding, in which the irradiation with the laser beam is performed along a welding bead at the root part while the laser beam is aimed at a contact point between the first welded material and the second welded material as an irradiation point of the laser beam, from a side of the welding bead, the contact point being contained in the non-welded portion of the root part.

The position of the contact point between the first welded material and the second welded material that is contained in the non-welded portion of the root part is identified by non-destructive inspection.

Further, a second aspect of the present disclosure has a configuration in which the laser beam is caused to pass along the welding bead multiple times while the irradiation point of the laser beam is shifted from the contact point to the side of the welding bead.

On this occasion, the one-time shift amount at the irradiation point of the laser beam is determined based on the spot diameter of the laser beam.

Furthermore, a third aspect of the present disclosure has a configuration in which the irradiation with the laser beam is performed along the welding bead while weaving with the laser beam is performed in a direction crossing the welding bead.

Moreover, a fourth aspect of the present disclosure has a configuration in which when the laser beam is aimed at the contact point between the first welded material and the second welded material as the irradiation point of the laser beam, the contact point being contained in the non-welded portion of the root part, the irradiation point is set such that at least an outer edge of a spot of the laser beam contacts with the contact point.

Moreover, a fifth aspect of the present disclosure has a configuration in which the irradiation with the laser beam is performed while a welding material is supplied.

A sixth aspect of the present disclosure is a repairing laser welding device for melting and eliminating a crack by irradiation with a laser beam, the crack being generated beginning at a non-welded portion of a root part between a first welded material and a second welded material obliquely joined to a surface of the first welded material by fillet welding, the repairing laser welding device including a laser oscillator, a laser head that performs irradiation with the laser beam supplied from the laser oscillator, a head drive mechanism that moves the laser head along a welding bead at the root part, and a tracing mechanism that causes an irradiation point of the laser beam to trace a contact point between the first welded material and the second welded material, the laser beam being emitted from the laser head that is moved along the welding bead by the head drive mechanism, the contact point being contained in the non-welded portion of the root part.

Further, a seventh aspect of the present disclosure is a repairing laser welding device for melting and eliminating a crack by irradiation with a laser beam, the crack being generated beginning at a non-welded portion of a root part between a first welded material and a second welded material obliquely joined to a surface of the first welded material by fillet welding, the repairing laser welding device including a laser oscillator, a laser head that performs irradiation with the laser beam supplied from the laser oscillator, and a head drive mechanism that moves the laser head along a welding bead at the root part, in which the head drive mechanism includes a rail and a carriage that is equipped with the laser head and that runs on the rail, and the rail is fixed with reference to both a surface of the first welded material to which the second welded material is joined and the second welded material, such that an irradiation point of the laser beam is a contact point between the first welded material and the second welded material, the laser beam being emitted from the laser head that is moved along the welding bead together with the carriage, the contact point being contained in the non-welded portion of the root part.

Furthermore, an eighth aspect of the present disclosure has a configuration in which the rail of the head drive mechanism has an angle steel shape including a vertical plate material and a horizontal plate material that are coupled so as to be capable of being separated from each other, positioning and fixing of the vertical plate material of the rail are performed with reference to the second welded material, positioning and fixing of the horizontal plate material of the rail are performed with reference to the surface of the first welded material to which the second welded material is joined, with respect to the vertical plate material fixed with reference to the second welded material, and the horizontal plate material of the rail is formed as a running path on which the carriage of the head drive mechanism runs while being guided by the vertical plate material, the carriage being placed on the horizontal plate material.

Moreover, a ninth aspect of the present disclosure is configured to include a weaving mechanism that performs weaving with the laser beam in a direction crossing the welding bead.

Moreover, a tenth aspect of the present disclosure has a configuration in which the irradiation point of the laser beam is set such that at least an outer edge of a spot of the laser beam contacts with the contact point between the first welded material and the second welded material, the contact point being contained in the non-welded portion of the root part.

In the repairing laser welding method and repairing laser welding device in the present disclosure, as the laser, it is general to use a YAG laser or a semiconductor laser, but the laser is not limited to them.

EXPLANATION OF REFERENCE SIGNS 1, 1A, 1B repairing laser welding device
2 laser oscillator
4 laser head
6 weaving mechanism
7 arm (shift mechanism)
8 tracing mechanism
10, 10A, 10B head drive mechanism
11A, 20B rail
12A, 22B carriage
22X horizontal plate material (rail)
22Y vertical plate material (rail)

103 steel floor slab
110 deck plate (first welded material)
112 downward-facing surface (a surface of the first welded material to which the second welded material is joined)
120 U-rib (second welded material)
121 side edge of U-rib
122 single bevel groove
B welding bead
Cb bead growth crack
Cd deck growth crack
P contact point
R root part
S non-welded portion

The invention claimed is:

1. A repairing laser welding device that melts and eliminates a crack by irradiation with a laser beam, the crack being generated beginning at a non-welded portion of a root part between a first welded material and a second welded material obliquely joined to a surface of the first welded material by fillet welding, the repairing laser welding device comprising:
a laser oscillator;
a laser head that performs irradiation with the laser beam supplied from the laser oscillator;
a head drive mechanism that moves the laser head along a welding bead at the root part; and
a tracing mechanism that causes an irradiation point of the laser beam to trace a contact point between the first welded material and the second welded material, the laser beam being emitted from the laser head that is moved along the welding bead by the head drive mechanism, the contact point being contained in the non-welded portion of the root part, the tracing mechanism comprising:
two tracing legs disposed at the laser head, each including a roller at their respective distal end and pressed against a downward-facing surface of the first welded material and a side edge of the second welded material, respectively.

2. The repairing laser welding device according to claim 1, further comprising a weaving mechanism that performs weaving with the laser beam in a direction crossing the welding bead.

3. The repairing laser welding device according to claim 2, wherein the irradiation point of the laser beam is set such that at least an outer edge of a spot of the laser beam contacts with the contact point between the first welded material and the second welded material, the contact point being contained in the non-welded portion of the root part.

4. The repairing laser welding device according to claim 1, wherein the irradiation point of the laser beam is set such that at least an outer edge of a spot of the laser beam contacts with the contact point between the first welded material and the second welded material, the contact point being contained in the non-welded portion of the root part.

5. A repairing laser welding method for melting and eliminating a crack by irradiation with a laser beam using the repairing laser welding device according to claim 1, the crack being generated beginning at a non-welded portion of a root part between a first welded material and a second welded material obliquely joined to a surface of the first welded material by fillet welding, wherein
the irradiation with the laser beam is performed along a welding bead at the root part while the laser beam is aimed at a contact point between the first welded material and the second welded material as an irradiation point of the laser beam, from a side of the welding bead, the contact point being contained in the non-welded portion of the root part.

6. The repairing laser welding method according to claim 5, wherein the laser beam is caused to pass along the welding bead multiple times while the irradiation point of the laser beam is shifted from the contact point to the side of the welding bead.

7. The repairing laser welding method according to claim 6, wherein the irradiation with the laser beam is performed along the welding bead while weaving with the laser beam is performed in a direction crossing the welding bead.

8. The repairing laser welding method according to claim 7, wherein when the laser beam is aimed at the contact point between the first welded material and the second welded material as the irradiation point of the laser beam, the contact point being contained in the non-welded portion of the root part, the irradiation point is set such that at least an outer edge of a spot of the laser beam contacts with the contact point.

9. The repairing laser welding method according to claim 8, wherein the irradiation with the laser beam is performed while a welding material is supplied.

10. The repairing laser welding method according to claim 7, wherein the irradiation with the laser beam is performed while a welding material is supplied.

11. The repairing laser welding method according to claim 6, wherein when the laser beam is aimed at the contact point between the first welded material and the second welded material as the irradiation point of the laser beam, the contact point being contained in the non-welded portion of the root part, the irradiation point is set such that at least an outer edge of a spot of the laser beam contacts with the contact point.

12. The repairing laser welding method according to claim 11, wherein the irradiation with the laser beam is performed while a welding material is supplied.

13. The repairing laser welding method according to claim 6, wherein the irradiation with the laser beam is performed while a welding material is supplied.

14. The repairing laser welding method according to claim 5, wherein the irradiation with the laser beam is performed along the welding bead while weaving with the laser beam is performed in a direction crossing the welding bead.

15. The repairing laser welding method according to claim 14, wherein when the laser beam is aimed at the contact point between the first welded material and the second welded material as the irradiation point of the laser beam, the contact point being contained in the non-welded portion of the root part, the irradiation point is set such that at least an outer edge of a spot of the laser beam contacts with the contact point.

16. The repairing laser welding method according to claim 15, wherein the irradiation with the laser beam is performed while a welding material is supplied.

17. The repairing laser welding method according to claim 14, wherein the irradiation with the laser beam is performed while a welding material is supplied.

18. The repairing laser welding method according to claim 5, wherein when the laser beam is aimed at the contact point between the first welded material and the second welded material as the irradiation point of the laser beam, the contact point being contained in the non-welded portion of the root part, the irradiation point is set such that at least an outer edge of a spot of the laser beam contacts with the contact point.

19. The repairing laser welding method according to claim 18, wherein the irradiation with the laser beam is performed while a welding material is supplied.

20. The repairing laser welding method according to claim 5, wherein the irradiation with the laser beam is performed while a welding material is supplied.

* * * * *